(12) United States Patent  
Buchanan et al.

(10) Patent No.: US 7,171,479 B2  
(45) Date of Patent: Jan. 30, 2007

(54) EFFICIENT DELIVERY OF BOOT CODE IMAGES FROM A NETWORK SERVER

(75) Inventors: William W. Buchanan, Wake Forest, NC (US); Simon C. Chu, Chapel Hill, NC (US); William J. Piazza, Holly Springs, NC (US); David B. Rhoades, Apex, NC (US); Linda A. Riedle, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 774 days.

(21) Appl. No.: 10/133,865

(22) Filed: Apr. 26, 2002

(65) Prior Publication Data

US 2003/0204603 A1    Oct. 30, 2003

(51) Int. Cl.  
*G06F 15/16* (2006.01)
(52) U.S. Cl. ..................... 709/228; 718/103
(58) Field of Classification Search ........... 709/203, 709/228, 240; 718/100, 102, 103  
See application file for complete search history.

(56) References Cited

U.S. PATENT DOCUMENTS

| | | | |
|---|---|---|---|
| 4,481,583 A | | 11/1984 | Mueller |
| 5,394,547 A | | 2/1995 | Correnti et al. |
| 5,826,081 A | | 10/1998 | Zolnowsky |
| 5,828,888 A | | 10/1998 | Kozaki et al. |
| 5,842,011 A | * | 11/1998 | Basu .............................. 713/2 |
| 5,914,950 A | * | 6/1999 | Tiedemann et al. ......... 370/348 |
| 5,920,701 A | | 7/1999 | Miller et al. |
| 5,974,547 A | * | 10/1999 | Klimenko ....................... 713/2 |
| 6,003,082 A | * | 12/1999 | Gampper et al. ............. 709/225 |
| 6,125,110 A | * | 9/2000 | Proctor et al. ............... 370/331 |

(Continued)

FOREIGN PATENT DOCUMENTS

WO    WO 01/13277 A2 *    2/2001

*Primary Examiner*—Patrice Winder  
*Assistant Examiner*—Benjamin A. Ailes  
(74) *Attorney, Agent, or Firm*—H. Artoush Ohanian; Cynthia S. Byrd; Biggers & Ohanian, LLP

(57) ABSTRACT

A network and method for servicing simultaneously pending boot image download requests in a multi-client, networked environment. A boot image server on the network is configured to satisfy boot image sessions initiated by one or more client systems on the network. The image server is configured to prioritize requests from different clients to minimize or reduce the network's average download time, which represents the amount of time required to boot a theoretical average client. In one embodiment, the image server is configured to minimize the average download time by prioritizing client requests according to the amount of time required to complete a each client's download such that requests from clients with short remaining download times are given higher priority and, conversely, request from clients with long remaining download times are given lower priority. The amount of download time remaining is estimated by maintaining a log the response time (round trip delay) of recently transmitted packets for each client. In one embodiment, a rolling average of recent response times is used to provide an estimate of the client's overall response time. The image server also tracks the size of the image file remaining to be downloaded for each client. Using these two parameters, the image server estimates the remaining time to download the image file and prioritizes the processing of outstanding packet requests based thereon.

24 Claims, 4 Drawing Sheets

U.S. PATENT DOCUMENTS

| | | |
|---|---|---|
| 6,170,008 B1 | 1/2001 | Bahlmann et al. |
| 6,205,150 B1 * | 3/2001 | Ruszczyk .................. 370/412 |
| 6,223,221 B1 * | 4/2001 | Kunz ......................... 709/224 |
| 6,631,118 B1 * | 10/2003 | Jones ......................... 370/252 |
| 6,862,622 B2 * | 3/2005 | Jorgensen .................. 709/226 |
| 2002/0087623 A1 * | 7/2002 | Eatough ..................... 709/203 |
| 2002/0090004 A1 * | 7/2002 | Rinchiuso .................. 370/468 |
| 2002/0178232 A1 * | 11/2002 | Ferguson .................... 709/217 |
| 2003/0046383 A1 * | 3/2003 | Lee et al. ................... 709/224 |
| 2003/0191795 A1 * | 10/2003 | Bernardin et al. .......... 709/105 |
| 2004/0029591 A1 * | 2/2004 | Chapman et al. ........ 455/452.1 |

* cited by examiner

| Client ID 200 | SIR 202 (packets) | FIS 203 (packets) | ENRT 204 (msec/packet) | RDT 205 (msec) | TOPS 206 (msec) | ENRT Pointer 207 | File Spec 208 |
|---|---|---|---|---|---|---|---|
| 1 | 819,200 | 1,238,902 | 17 | 13,926,400 | 0 | * | C:\Imagfes\Linux7\... |
| 2 | 1,656,256 | 1,700,567 | 2 | 3,312,512 | 93,848,925 | * | C:\Imagfes\Win2K\... |
| 3 | 3,034 | 1,345,109 | 4 | 12,136 | 93,848,803 | * | C:\Imagfes\Linux7\... |
| 4 | 798,295 | 800,001 | 12 | 9,579,540 | 0 | * | C:\Imagfes\Special\... |
| 5 | 1,238,756 | 1,238,902 | 5 | 6,193,780 | 0 | * | C:\Imagfes\Linux7\... |
| 6 | 1,700,432 | 1,700,567 | 4 | 6,801,728 | 0 | * | C:\Imagfes\Win2K\... |
|  |  |  |  |  |  |  |  |

201

| Packet No. 310 | Round Trip Time. 311 |
|---|---|
| 1 | 3 |
| 2 | 4 |
| 3 | 3 |
| 4 | 12 |
| 5 | 5 |
| 6 | 6 |
| 7 | 0 |
| 8 | 0 |

← Next Position Pointer 312

ENRT TRACKING TABLE 301

FIG 3

| Priority 420 | Client ID 421 | Packet Outstanding 422 | Start Offset in File 423 |
|---|---|---|---|
| 1 | 3 | X | 1,342,075 |
| 2 | 2 | X | 44,311 |
| 3 | 5 |  | 146 |
| 4 | 6 |  | 135 |
| 5 | 4 |  | 1,706 |
| 6 | 1 |  | 419,702 |

REQUEST QUEUE 401

FIG 4

EFFICIENT DELIVERY OF BOOT CODE IMAGES FROM A NETWORK SERVER

BACKGROUND

1. Field of the Present Invention

The present invention generally relates to the field of data processing networks and more particularly to a network and method for improving the time required to boot multiple client systems from a boot image server.

2. History of Related Art

Network "booting" is well known process by which an initial software image is loaded into a data processing system (referred to as a client system or simply client) from a network server over the network. Historically, network booting was achieved using basic I/O system (BIOS) extensions located in special memory modules on network adapter cards. These special memory modules, informally referred to as "boot ROM's," implemented protocols such as Remote Initial Program Load (RIPL). More recently, client systems are typically provided with firmware designed to load a pre-boot execution environment (PXE). PXE uses a combination of Dynamic Host Configuration Protocol (DHCP) and Trivial File Transfer Protocol (TFTP) to locate a server on the network, assign an address to the client system requesting a boot image, and to provide the boot image to the client. In a typical PXE session, the client system initiates the protocol by broadcasting a DHCP "discover" request containing an extension that identifies the request as coming from a PXE-enabled client. Assuming that a DHCP server (or a Proxy DHCP server) implementing this extended protocol is available, the available server sends the client a list of appropriate Boot Servers. The client then discovers a Boot Server of the type selected and receives the name of an executable file on the chosen Boot Server. The client then uses TFTP to download the executable file from the Boot Server in multiple 512-byte data packets within the context of a Transmission Control Protocol (TCP) session. Finally, the client initiates execution of the downloaded image.

Depending upon the circumstances, a large number of client systems may issue simultaneous requests to the server for a boot image. In a server cluster configuration, for example, multiple network servers are installed in a single chassis or rack. All servers in the rack typically share some resources such as power. When the rack is powered on, all servers in the rack are powered on more or less simultaneously thereby resulting in multiple substantially simultaneous requests for boot images. (It should be noted that these network servers are the client systems for purposes of requesting and obtaining a boot image over the network.) In an IBM xSeries Server Blade implementation, as an example, as many as 84 server blades may be installed in a single rack. If none of these blades has a local, persistent mass storage device, also referred to as a direct access storage device (DASD), all 84 servers may request a boot image at approximately the same time when power is restored. Because the network boot procedure described executes within the context of a TCP session in which each data packet must be acknowledged before the next packet is sent, it will be appreciated by those familiar with data processing networks and network protocols that the described boot scenario could saturate the network bandwidth thereby resulting in a slow boot process. The problem could be further exacerbated in a power outage scenario in which an entire room of racks could be powered on simultaneously following a black-out.

Server clusters and similar networked configurations are frequently used as data centers that are crucial for conducting business. It is therefore desirable to bring such networked systems up in the fastest possible time. One measurement of the efficiency of the image downloading process is referred to as the Average Download Time (ADT). As its name implies, the ADT represents the average amount of time that systems wait to download their images from the boot server. ADT is influenced largely by the size of the image, the available network bandwidth, and the number of clients accessing the server at once. The ADT is computed by summing the duration of each client's TCP session and dividing by the number of clients.

Boot servers must decide the order in which to handled packet requests from the client systems. Ideally, the boot servers attempts to fully utilize the available network bandwidth. Historically, requests for data packets would be scheduled according to a FIFO algorithm or in round-robin fashion. Unfortunately, it is well known in the industry that FIFO and round-robin selection schemes are not optimally efficient. Accordingly, it would be highly desirable to implement a network method and system that employed a strategy for booting client systems on the network in an optimal fashion.

SUMMARY OF THE INVENTION

The problems identified above are in large part addressed by a network and method for servicing simultaneously pending boot image download requests in a multi-client, networked environment. A boot image server on the network is configured to satisfy boot image sessions initiated by one or more client systems on the network. The image server is configured to prioritize requests from different clients to minimize or reduce the network's average download time, which represents the amount of time required to boot a theoretical average client. In one embodiment, the image server is configured to minimize the average download time by prioritizing client requests according to the amount of time required to complete a each client's download such that requests from clients with short remaining download times are given higher priority and, conversely, request from clients with long remaining download times are given lower priority. The amount of download time remaining is estimated by maintaining a log of the response time (round trip delay) of recently transmitted packets for each client. In one embodiment, a rolling average of recent response times is used to provide an estimate of the client's overall response time. The image server also tracks the size of the image file remaining to be downloaded for each client. Using these two parameters, the image server estimates the remaining time to download the image file and prioritizes the processing of outstanding packet requests based thereon.

BRIEF DESCRIPTION OF THE DRAWINGS

Other objects and advantages of the invention will become apparent upon reading the following detailed description and upon reference to the accompanying drawings in which:

FIG. 3 is a conceptualized representation of a response time tracking table suitable for estimating a client's response time according to one embodiment of the invention;

FIG. 4 is a conceptualized representation of a request queue according to one embodiment of the invention.

Figure 1:
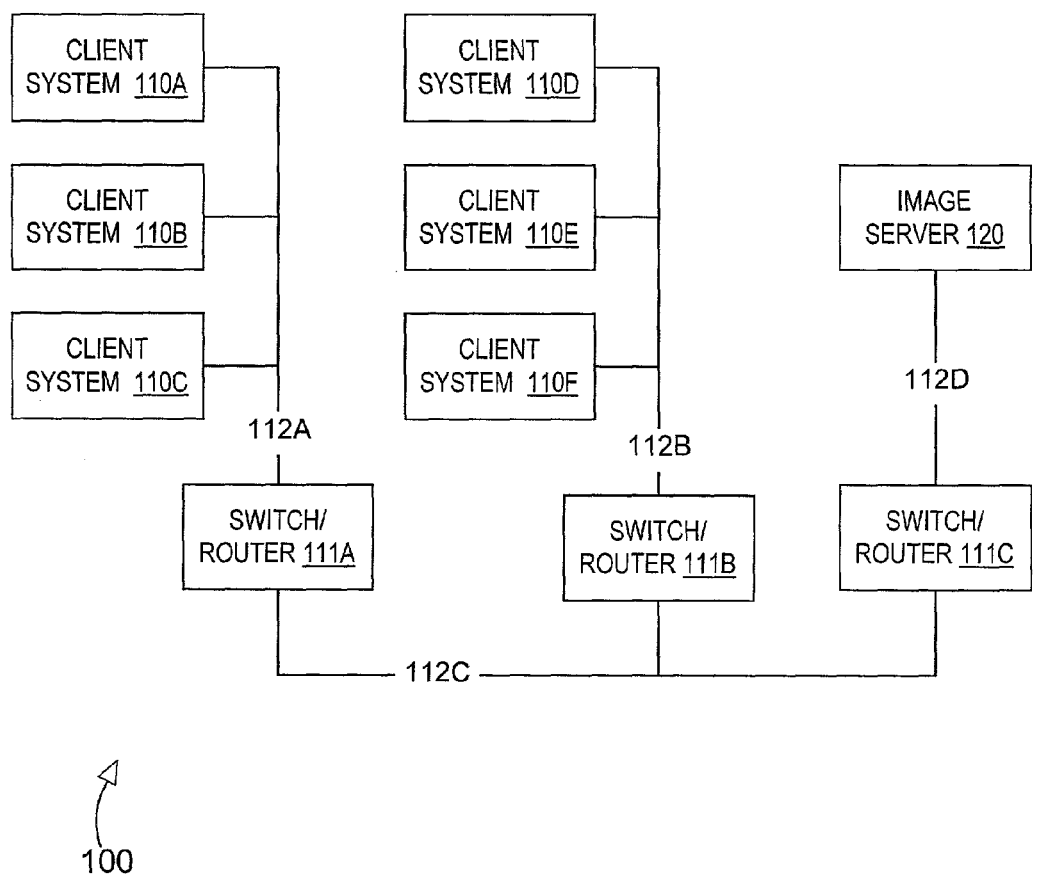
FIG. 1 is a block diagram of selected elements of a data processing network.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

Generally speaking, the present invention contemplates a method of booting multiple systems on a data processing network that minimizes the networks average download time.

Turning now to the drawings, FIG. 1 is a block diagram of selected elements of a data processing network 100 suitable for implementing an embodiment of the present invention. In the depicted embodiment, network 100 includes a set of clients systems 110A–110F (generically or collectively referred to as client system(s) 110). Each client system 110 is typically implemented as a microprocessor-based data processing system. Accordingly, each client system 110 typically includes one or more general purpose microprocessors that are interconnected to a system memory suitable for storing data and executable instructions and to one or more I/O devices such as a network adapter, graphics adapter, etc.

In the depicted embodiment, one or more client systems 110 need to retrieve or download their respective boot images from an image server 120. Client systems 110 may all be co-located on the same network segment or they may reside on multiple network segments identified in FIG. 1 by reference numerals 112a–112d (generically or collectively referred to as network segment(s) 112). The various network segments 112a–112d are interconnected through network switches and/or routers identified by reference numerals 111a–111c. Each network segment 112 may have different characteristics (physical medium, for example) and operating speeds. Server 120 may be operating on a network segment 112d that operate at 1 GB/sec while clients 110 may be on network segments that operate at 100 MB/sec. Intermediate network segments such as network segment 112c may operate at speeds that are higher than, lower than, or equal to the speeds of adjacent segments.

Portions of the present invention may be implemented as a sequence or collection of computer executable instructions (software) for prioritizing image downloads in a networked environment. The software is provided on a computer readable medium. The computer readable medium may include a volatile medium such as the system memory of image server 120 or a non-volatile (persistent) medium such as a floppy diskette, CD ROM, DVD, hard disk, computer tape, flash memory device, ROM, or the like. In addition, portions of the software may be located entirely on one system in the network such as image server 120 or distributed across multiple systems.

Generally speaking, the invention contemplates a method and system for managing simultaneously pending requests from multiple client systems. In the described embodiment, each of the client requests represents a request to download a file, and more specifically, a boot image file, from a boot image server. Each client request is typically associated with a corresponding network connection. The boot image server is typically configured via installed software, firmware, and/or hardware to track or estimate the performance or responsiveness of each network connection. Based upon the maintained responsiveness figures, the boot image server is configured to estimate the time remaining to complete the download associated with each pending request and to prioritize the requests accordingly. The requests corresponding to the shortest remaining download time are given the highest priority. In this manner, the average download time across the entire network is reduced or minimized. When a new client session or connection is established, the boot image server may assign the new session a default responsiveness characteristic that, at least initially, grants the new session a high priority.

In one embodiment, the invention includes a scheduling algorithm referred to herein as a Shortest Remaining Download Time (SRDT). The SRDT executes on image server 120 to prioritize the sequence in which client system requests for a boot image are serviced. As suggested by its name, the SRDT prioritizes client requests based, at least in part, upon an estimate of the time required to complete the image download. With the SRDT algorithm, the client that will require the least time to complete its download is given the highest priority by image server 120. The algorithm is pre-emptive in that each client 110 may present a request for the next packet at any time and the client with the least remaining download time will receive the highest priority when the next packet is to be served.

The Remaining Download Time (RDT) for each client 110 is established when a request for a packet from that client is received by the image server 120. Once determined, the RDT is stored in a table or other suitable data structure. The request's priority is determined by the its corresponding RDT where the request corresponding to the lowest RDT is given the highest priority. Image server 120 estimates the RDT, according to one embodiment of the invention, by multiplying the Size of the Image Remaining (SIR) by the Effective Network Response Time (ENRT) associated with the client. Once calculated, the RDT is stored in a table or other suitable data structure and the priority of the request is established by determining which pending request has the smallest associated RDT. Although the RDT is most readily conceptualized as a measure of time, it may be stored in any format that provides an accurate, relative assessment of which the time required to complete each download.

The Size of Image Remaining (SIR) can be determined by subtracting the starting point of the most recent packet request from the total size of the image file. The Effective Network Response Time (ENRT) is influenced by a number of factors, including the speed of the network segments, the volume of traffic on the individual segments, the number and efficiency of switches and routers between the two systems, the disk speed at the client and at the server, and the efficiency of the network and operating system software stacks at the client and at the server.

Those familiar with data processing networks will appreciate that it is generally difficult, if not impossible, to determine values for all of the factors influencing ENRT. One embodiment of the invention proposes estimating the cumulative effect of these factors by measuring the time required for a client to receive and acknowledge information packets sent to it. Beneficially, this estimate may be performed entirely by image server 120. In cases where slower network links, high network traffic volumes, slow DASD hardware, or inefficient network protocol stacks are involved, this measured time interval will increase relative to exchanges without these problems. In cases where the slow network, slow hardware, high traffic volume, or inefficient stack is on the server side, the slowdown will be experienced in the transmissions to all clients equally.

Initially (i.e., immediately following a reset), image server 120 may not know the ENRT between itself and any given client 110. Accordingly, it is generally required to provide an initial estimate of the ENRT for each client system 110. In one embodiment, image server 120 initially assumes an idealized network in which the ENRT for each client is 0. In other embodiments, image server 120 may preserve historical ENRT values across power domains (such as by storing the ENRT's to disk) to provide initial estimates of each client's ENRT. If the implementation uses an initial ENRT estimate of 0, a newly discovered client system will have the highest priority on the network. As packets are exchanged, image server 120 maintains transfer rate data and uses the data to revise the ENRT's for each client.

The ENRT is typically measured at the start of a session and updated as the image download proceeds. In one embodiment, image server 120 measures the ENRT by storing a first time stamp immediately before sending a packet to a client 110. A second time stamp is stored immediately after the client acknowledges the packet. The ENRT is then determined as the difference between the two time stamps. The ENRT used by image server 120 is preferably based upon transmission data taken from several packets rather than just a single packet to avoid a situation in which a single network congestion problem drops a client's priority from immediate consideration.

New clients 110 may open sessions with image server 120 at any time. As previously described, image server 120 may initially give a new client highest priority. As packets are transmitted to the client, however, the true characteristics of the client's network connection will be discovered and its priority reduced accordingly. Clients may also close sessions at any time, even before an image download is complete. A closed client is dropped from the transmission monitoring and priority determining data structure described in greater below.

The SRDT algorithm insures that the Average Download Time is minimal. If four clients (110A–110D) have download times of a, b, c, and d respectively and the clients are prioritized with 110A first, 110B second, 110C third, and 110D fourth, then the ADT for the four clients is equal to (4a+3b+2c+d)/4 because, qualitatively, all four clients must wait for "a" to complete, three of the four clients must wait for "b" to complete, and so forth. Assuming a, b, c, and d are all unequal to each other, the ADT quantity is minimized when a<b<c<d. Accordingly, the ADT is minimized if the client system having the shortest download time is given the highest priority. Although this example illustrate the case of four clients 110, it will be appreciated that the same result can be extended to a greater (or lesser) number of clients. In addition, although the described example assumes a sequential download process in which the download to client 110A completes before the download to client 110B begins, the same result (i.e., a reduced ADT) is achieved when image server 120 services clients in an overlapping fashion in which the image server services a request from a second client system while awaiting acknowledgement of a previously delivered packet from a first client system.

Figure 2:
FIG. 2 is a conceptualized representation of an image download session table suitable for use in one embodiment of the invention.

Referring now to FIGS. 2, 3, and 4, examples of data structures suitable for implementing one embodiment of the present invention are described. FIG. 2 is a conceptual representation of a data structure referred to herein as session table 201 suitable for implementing the SDRT algorithm according to the present invention. In the depicted embodiment, session table 201 includes a client identification column 200, an SIR column 202, a Full Image Size (FIS) image column 203, an ENRT column 204, and RDT column 205, a Time Outstanding Packet Sent (TOPS) column 206, a pointer column 207, and a file name column 208. Each row in session table 201 represent an entry. A new entry is made in session table 201 each time a download session is initiated. Conversely, a table entry is deleted when a session terminates. For each client system 110, the size of the image file request is stored in FIS column 203. and the size of the image remaining to be downloaded is stored in SIR column 202. Initially, the value in SIR column 202 is set to the value in FIS column 203.

As each download session proceeds, the full image size data in column 203 remains constant while the value in SIR column 202 decrements each time the client corresponding to the table entry acknowledges a packet. In one embodiment, the value in ENRT is initially set to 0 when a new entry is added (i.e., when a new client system 110 initiates a download session). This ENRT value is updated by image server 120 as each packet delivered to the client system is acknowledged. The values in ENRT column 204 are indicative of the average roundtrip time for recent packets sent to each client. The roundtrip time includes the time required for a packet to be delivered from image server 120 plus the time to be acknowledged by the client system.

Each value in RDT column 205 is computed by multiplying the corresponding value in SIR column 202 by the value in ENRT column 204. The values in RDT column 205 thus represent an estimate of how much time is required to complete the image download for each client where a large RDT value indicates a relatively long time remains before the corresponding download completes and a small value indicates a relatively short time remaining.

The values in TOPS column 206 are timestamps indicating when the most recent packet was sent to the corresponding client system. Image server 120 uses these TOPS values to estimate the ENRT for each connection. Immediately prior to sending a packet to a client, image server 120 a timestamp in the appropriate entry of TOPS column 206. When an acknowledgement of the packet is received by image server 120, a second timestamp is taken and the roundtrip response time is calculated as the difference between the second timestamp and the timestamp stored in TOPS column 206.

The depicted embodiment of session table 201 includes a pointer column 207 that points to the ENRT tracking table 301 conceptually depicted in FIG. 3. ENRT track table 301 is used to store recent packet response time data. In one embodiment, the ENRT represents a rolling average of the response time for recently transmitted packets. ENRT tracking table 301 beneficially enables image server 120 to base its determination of ENRT on recent data while simultaneously providing protection from a situation in which a single spurious packet response data point unnecessarily skews the prioritization scheme.

When a new client session is initiated, image server 120 generates an instance of tracking table 301 corresponding to the client. The depicted embodiment of tracking table 301 is includes a packet number column 310 and a Round Trip Time column 311. When tracking table 301 is created, the values in its Round Trip Time column 311 are initialized to 0. Tracking table 301 maintains a history of packet response times for the last "N" packets where N is the number of rows in table 301. A next position pointer 312 is associated with each Tracking table 301. Pointer 312 is initialized to point to the first entry in the table.

Each time a packet is acknowledged, image server 120 updates tracking table 301 by recording the packet's response time in the entry of column 311 pointed to by pointer 312. After recording an entry, image server 120 then updates the pointer 312. Pointer 312 is updated by incrementing it until it reaches the last entry in table 312, at which time the pointer is reset to the initial entry. In this manner, ENRT tracking table implements a circular queue and tracks the round trip time of the last N packets for the corresponding client system. In a preferred embodiment of the invention, the number of entries (N) in tracking table 301 is a relatively small power of two, such as 8 or 16 so that (1) the number of entries does not become excessive thereby rendering image server 120 overly static (2) the division required to compute an average delay time can be achieved using a relatively fast arithmetic shift operation rather than a relatively slow divide operation. Each time a new packet request is received from a client, the ENRT for that client is computer and stored in ENRT column 204 of session table 201. The ENRT is computed by summing all N entries in column 311 of tracking table 301 and dividing by the number of entries. Because the round trips terms are initialized to 0, initial request from a client receive a high priority based upon an idealized ENRT. New client systems, therefore, initially enjoy an artificially heightened priority status. After a relatively few packets have been acknowledged, however, the ENRT value will more accurately reflect the actual response time of the client's connection. If the ENRT value computer from data in tracking table 301 becomes large enough, the client priority will drop to enable client's with more attractive response time's to enjoy priority. Thus new client sessions may enjoy priority status initially, but this condition may only last long enough to transfer a few packets of information. If, after completing the transfer of these initial packets, the new client download session is estimated to be shorter than other session s already in progress, the transfer of packets to the new client continues. If the new client session is estimated to take a long time to complete, then image server 120 decreases the priority of the new client and resumes servicing the original set of clients.

Referring now to FIG. 4, a conceptualized representation of a Request Queue 401 is depicted. Request Queue 401 is used by image server 120 to determine the next request to be serviced. In the depicted embodiment Request Queue 401 includes a priority column 420, a client column 421, a packet outstanding column 422, and a starting offset column 423. When a client system 110 requests a packet, image server 120 re-calculates the client's ENRT using the information in ENRT tracking table 301. The updated ENRT value is then stored in column 204 of session table 201 and the corresponding RDT value in column 105 is calculated in conjunction with the SIR data in column 202. The RDT information is used to determine the priority status of each client's request with the client corresponding to the lowest RDT enjoying the highest priority. The packet outstanding column 422 of queue 401 is used by image server 120 to indicate which requests have been processed (i.e., sent to the client). When image server 120 is available to service a request, the highest priority request that has not been serviced is chosen. A timestamp is recorded in TOPS column 206 of session table 201 and the appropriate packet is retrieved based upon the offset information in column 423 and sent. When the packet is subsequently acknowledged (or times out), the appropriate entry in round-trip time column 311 of tracking table 301 is updated and the request entry is deleted from Request Queue 401.

Figure 5:
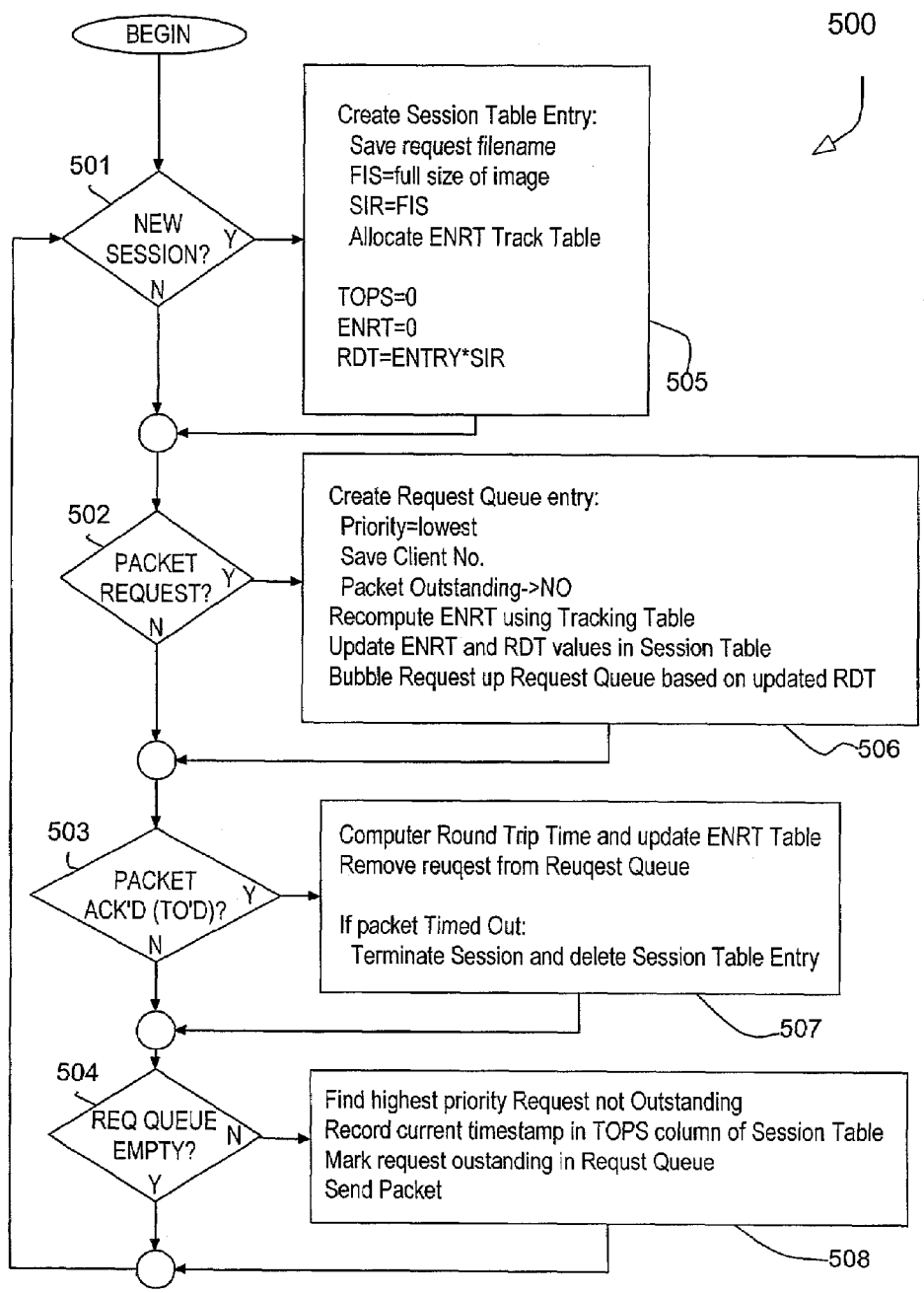
FIG. 5 is a flow diagram illustrating a method of handling image download request in a networked environment according to one embodiment of the invention.

Referring now to FIG. 5, a flow diagram of a method 501 of processing boot image requests in a data processing network according to one embodiment of the invention is depicted. Generally, image server file monitors the network for certain events and, upon detecting one of the events, takes appropriate action. Thus, the method 500 depicted in FIG. 5 is configured as an endless loop in which the image server determines in one of the decision blocks 501–504 whether an event has occurred. If the event has occurred, the image server takes appropriate action. If the event has not occurred, the method resumes checking for the other events. In the depicted embodiment of method 500, the events that image server 120 monitors for include initiation of a new client session (block 501), the receipt of a packet request from an existing client system (block 502), the acknowledgement or time-out of a previously serviced packet (block 503), and detection of pending packet requests (block 504). While the illustrated example of method 500 includes these four events additional events may be monitored within the spirit and scope of the present invention.

In the depicted embodiment, image server 120 determines in block 501 whether a new image download session is being established. Typically, a new session is established whenever a client system 110 on the network serviced by image server 120 is powered on or otherwise reset. If image server 120 detects a new session, it takes appropriate action to allocate and initialize (block 505) the necessary data structures.

These actions include allocating an entry in session table 201. Once the entry is created, image server 120 typically stores the file name (also referred to as a file specification) of the requested boot image in file name column 208 and initializes the SIR column 202 and FIS column 203 with the size (in packets) of the requested image file. In addition, image server 120 will allocate a Tracking Table 301 for the newly established entry in session table 201. Each entry in round trip column 311 of tracking table 301 is initialized to 0 and pointer 312 is initialized to the first entry. In addition, image server 120 will initialize the values of TOPS column 206 and ENRT column 204 in session table 201 to 0. As indicated previously, the initial ENRT values may be initialized to a value other than 0 if, for example, image server 120 has preserved a historical ENRT value for a particular client system. Initial values for RDT column 105 are then computed as the product of the corresponding ENRT and SIR values.

The second event monitored by image server 120 is the detection of a packet request from a client in block 502. Generally speaking, upon detecting a packet request, image server 120 records and prioritizes (block 507) the request with respect to all other outstanding packet requests based upon an estimate of the RDT, the time remaining to complete the requesting client's boot image download. The image server estimates RDT based upon the client's per packet response time (ENRT) and the size of the image remaining to be downloaded. In the depicted embodiment, this prioritization is accomplished by initially assigning the request the lowest priority of all pending requests in Request Queue 401, associating the client's ID or number with the request, and resetting the corresponding value in Packet Outstanding column 422. After the request has been stored in Request Queue 401, image server 120 computes (or recomputes) the client's ENRT using ENRT tracking table 301. The computed value of ENRT is then stored in the appropriate entry of session table 201 and the corresponding RDT value is updated based upon the size ENRT and the size of the file remaining to be downloaded. Once the RDT value is updated, image server 120 adjust the priority of the client's request by bubbling the request up Request Queue 401 based upon the RDT values in session table 201. In this manner, packet requests are continuously prioritized consistent with the Shortest Remaining Download Time (SRDT) objective.

Upon detecting an acknowledgement or time-out of a packet in block 503, the depicted embodiment of method 500 determines the specific response time for this packet and updates its estimate of the client's response time generally. The specific response time is determined by recording a time stamped when the packet is acknowledged and computing the difference between the acknowledgement time stamp and a time stamp that was recorded when the packet was serviced. This specific response time is stored in the client's ENRT tracking table 301 at the location indicated by the tracking table's pointer 312 and the pointer is incremented. The entry in Request Queue 401 corresponding to the request is then deleted or otherwise removed. If image server 120 detecting time out rather than an acknowledgement, appropriate action is taken. Typically, this action includes terminating the client's session and deleting the session's entry in session table 201.

When image server 120 is ready to process a pending request, it determines in block 504 whether Request Queue 401 contains any pending and unserviced packet requests. If no unserviced requests are pending, image server 120 resumes monitoring events. If one or more unserviced requests are found the queue, image server 120 processes (block 508) the next request. This processing typically includes determining which of the pending unserviced requests has the highest priority and associating a timestamp (in session table 201) with the request. Finally, the request's Packet Outstanding entry in Request Queue 401 is set and the request packet is sent to the client.

It will be apparent to those skilled in the art having the benefit of this disclosure that the present invention contemplates a system and method for managing multiple simultaneously pending boot image requests in an image server. It is understood that the form of the invention shown and described in the detailed description and the drawings are to be taken merely as presently preferred examples. It is intended that the following claims be interpreted broadly to embrace all the variations of the preferred embodiments disclosed

What is claimed is:

1. A method of managing a client request to download a file from a server, comprising:
   initially prioritizing the request to have a highest priority among a set of pending requests;
   maintaining a responsiveness figure for a connection between the client and the server, wherein the responsiveness figure is determined based on a responsiveness associated with each of a set of packets communicated between the sewer and the client;
   maintaining a time to complete the client request determined, at least in part, on the responsiveness figure; and
   adjusting a priority of the request according to the time to complete wherein a priority of an other request having a shorter time to complete is higher than the priority of the request.

2. The method of claim 1, wherein the server comprises a boot image server and wherein the request comprises a request to download a boot image file from the sewer.

3. The method of claim 1, wherein maintaining the responsiveness figure for the request comprises estimating a delay time indicative of the time required to send a packet to the client.

4. The method of claim 3, wherein maintaining the responsiveness figure comprises maintaining a table of delay times associated with each of a set of most recently transmitted packets.

5. The method of claim 4, wherein a number of entries in the table is $2^N$ where N is a positive integer wherein a running average of the times to send is calculable by summing the times to send in the table and shifting a resulting sum N−1 times.

6. The method of claim 1, maintaining the time to complete comprises multiplying the responsiveness figure by a size of the file remaining to be downloaded.

7. The method of claim 3, wherein adjusting the priority comprises adjusting the priority after each packet.

8. The method of claim 4, wherein initially prioritizing the request to have a highest priority includes initializing the set of delay times in the table to a zero value.

9. A computer program product comprising a sequence of computer executable instructions for managing a client request to download a file from a server, the instructions being stored on a computer readable medium, the instructions comprising:
   instructions for initial prioritizing the request to have a highest priority among a set of pending requests:
   instructions for maintaining a responsiveness figure for a connection between the client and the serve, wherein the responsiveness figure is determined based on a responsiveness associated with each of a set of packets communicated between the server and the client;
   instructions for maintaining a time to complete the client request determined, at least in part, on the responsiveness figure; and
   instructions for adjusting a priority of the request according to the time to complete wherein a priority of an other request having a shorter time to complete is higher than the priority of the request.

10. The computer program product of claim 9, wherein the server comprises a boat image server and wherein the request comprises a request to download a boot image from the server.

11. The computer program product of claim 9, wherein the instructions for maintaining the responsiveness figure for the request comprise instructions for estimating a delay time indicative of the time required to send a packet to the client.

12. The computer program product of claim 11, wherein the instructions for maintaining the responsiveness figure comprise instructions for maintaining a table of delay times associated with each of a set of most recently transmitted packets.

13. The computer program product of claim 12, wherein a number of entries in the table is $2^N$ where N is a positive integer wherein a running average of the times to send is calculable by summing the times to send in the table and shifting a resulting nun N−1 times.

14. The computer program product of claim 9, the instructions for maintaining the time to complete comprise instructions for multiplying the responsiveness figure by a size of the file remaining to be downloaded.

15. The computer program product of claim 11, wherein the instructions for adjusting the priority comprise instructions for adjusting the priority after each packet.

16. The computer program product of claim 12, wherein the instructions for initially prioritizing the request to have a highest priority includes instructions for initializing the set of delay times in the table to a zero value.

17. In a data processing network, a server comprising at least one processor, storage, and a network interface, wherein the storage includes executable instructions for managing a client request to download a file from the server, the instructions being stored on a computer readable medium, the instructions comprising:
- instructions for initially prioritizing the request to have a highest priority among a set of pending requests;
- instructions for maintaining a responsiveness figure for a connection between the client and the server, wherein the responsiveness figure is determined based on a responsiveness associated with each of a set of packets communicated between the server and the client;
- instructions for maintaining a time to complete the client request determined, at least in part, on the responsiveness figure; and
- instructions for adjusting a priority of the request according to the time to complete wherein a priority of an other request having a shorter time to complete is is higher than the priority of the request.

18. The server system of claim 17, wherein the sewer comprises a boot image server and wherein the request comprises a request to download a boot image from the server.

19. The server system of claim 17, wherein the instructions for maintaining the responsiveness figure for the request comprise instructions for estimating a delay time indicative of the time required to send a packet to the client.

20. The server system of claim 19, wherein the instructions for maintaining the responsiveness figure comprise instructions for maintaining a table of delay times associated with each of a set of most recently transmitted packets.

21. The sewer system of claim 20, wherein a number of entries in the table is $2^N$ where N is a positive integer wherein a running average of the times to send is calculable by summing the times to send in the table and shifting a resulting sum N−1 times.

22. The server system of claim 17, the instructions for maintaining the time to complete comprise instructions for multiplying the responsiveness figure by a size of the file remaining to be downloaded.

23. The server system of claim 19, wherein the instructions for adjusting the priority comprise instructions for adjusting the priority after each packet.

24. The server system of claim 20, wherein the instructions for initially prioritizing the request to have a highest priority includes instructions for initializing the set of delay times in the table to a zero value.

* * * * *